United States Patent

[11] 3,618,049

| [72] | Inventors | Juan J. Amodei |
| --- | --- | --- |
| | | Levittown, Pa.; |
| | | Reubens Mezrich, Hightstown, N.J. |
| [21] | Appl. No. | 809,137 |
| [22] | Filed | Mar. 21, 1969 |
| [45] | Patented | Nov. 2, 1971 |
| [73] | Assignee | RCA Corporation |

[54] HOLOGRAM MEMORY
9 Claims, 5 Drawing Figs.

[52] U.S. Cl. .................................................. 340/173,
346/74
[51] Int. Cl. ..................................................... G11c 11/00
[50] Field of Search ........................................... 340/173;
346/74, 76

[56] References Cited
UNITED STATES PATENTS
3,286,025 11/1966 Ingersol .................... 340/173
3,362,017 1/1968 Brahm ...................... 340/173

Primary Examiner—Terrell W. Fears
Attorney—H. Christoffersen

ABSTRACT: Each location in hologram memory comprises a thin film of a material such as bismuth which may be erased with a laser beam to thereby destroy the film and which may be restored by flash evaporating onto the same area a new film. The flash evaporation is performed by a very small heating element impregnated with metal at each location.

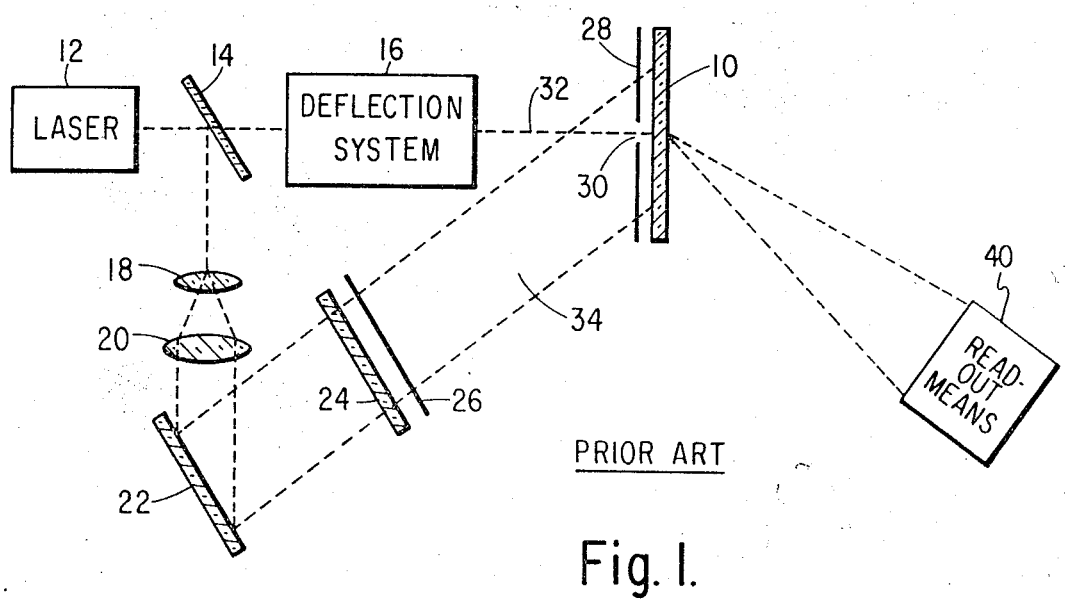
PRIOR ART
Fig. 1.
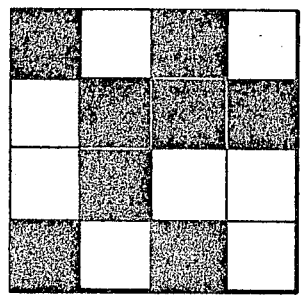
Fig. 2.
| P | P | P | P |
| --- | --- | --- | --- |
| P | P | P | P |
| P | P | P | P |
| P | P | P | P |
Fig. 3.

INVENTOR
Juan J. Amodei and
Reuben S. Mezrich 3,618,049.

HOLOGRAM MEMORY

BACKGROUND OF THE INVENTION

There is a need in the computer industry for a large capacity memory which can be operated at reasonable speed and whose information content readily can be altered. Holographic storage may be the basis for a solution to this problem as it does permit extremely high bit-packing density. However, at the present time, the most practical storage medium is photographic film and this material is suitable only for permanent storage. Photochromic materials have been proposed for storing holograms and they are erasable. However, such materials are still in an early state of development and many problems remain to be solved before they become suitable for commercial introduction.

The object of the present invention is to provide another solution to this problem.

SUMMARY OF THE INVENTION

The storage medium of the invention is a thin film storing information as a contour pattern corresponding to the intensity variations of a light pattern. The contour pattern, for example, may be a phase hologram and it may be read out with coherent light. The film at any location may be erased by heating the same sufficiently to, for example, vaporize the film. Renewal of a film location is achieved by flash evaporating thereon another thin film.

BRIEF DESCRIPTION OF THE DRAWING

FIG. 1 is a block and schematic showing of a known hologram memory;

FIGS. 2 and 3 are schematic showings of portions of the system of FIG. 1;

DETAILED DESCRIPTION

Figure 4:
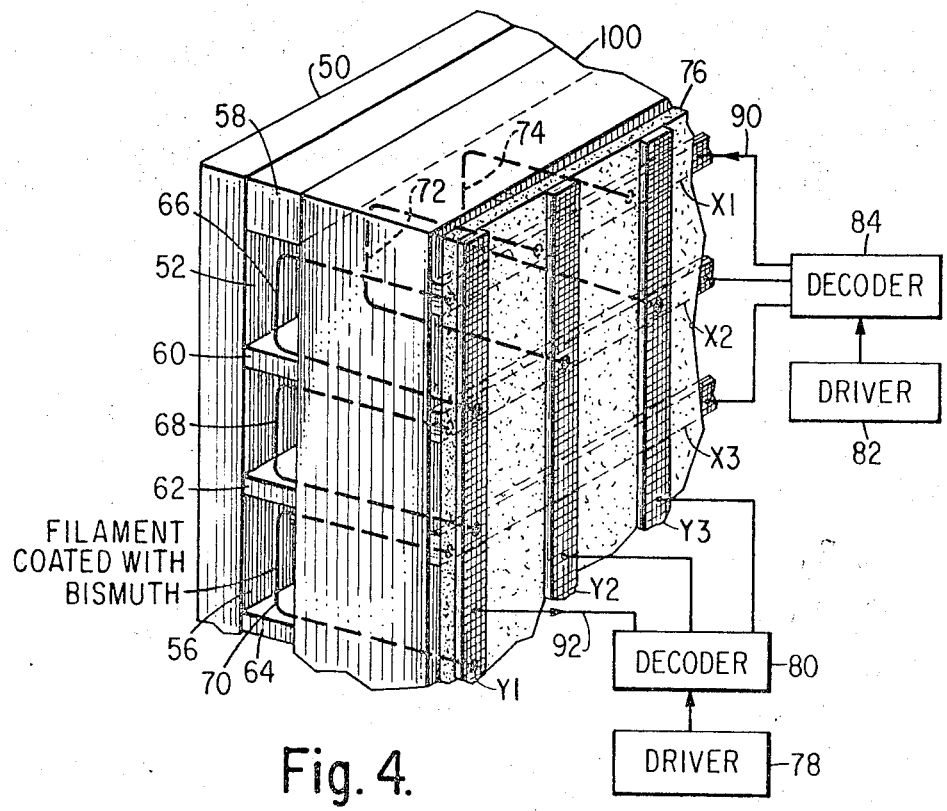
FIG. 4 is a view, partially in perspective, of one form of the present invention.

The known system of FIG. 1 includes a laser 12 which applies a portion of a coherent light beam through half-silvered mirror 14 to the deflection system 16. Another portion of the beam is reflected from the mirror and through an optical system, illustrated schematically by the two lenses 18 and 20, onto mirror 22. In one form of system, the mirror reflects the broadened beam of light through a diffuser 24 and object 26 and onto the mask 28. The mask is formed with an aperture 30 therein and the reference beam 32 and a portion of the object or information beam 34 passes through this aperture.

The object 26 may consist of a "page" of binary information such as illustrated in FIG. 2. While in practice this page may contain $10^4$ to $10^6$ bits, for purposes of the present discussion only 16 such bits are shown. A bit of one value, such as binary 1, is represented by a transparent square and the bit of other value, binary 0, by an opaque square.

The mask 28, when employed, is mechanically movable in two directions to permit any one of say $10^3$ to $10^6$ storage locations on the storage medium 10 to be accessed. Of course, each time it is desired to write in another memory location, a different page may be inserted at 26. The opening in the mask and the storage location defined thereby may be very small— of the order several millimeter square or less.

When the laser 12 is turned on, the deflection system 16, which may be any one of a number of known electronic, acoustic, or electromechanical systems, deflects the laser beam through the opening 30 in the mask 28 and onto a storage location on the storage medium 10. A portion of the information beam also illuminates the same location on the storage medium 10. The result of the illumination of the surface of the medium 10 by the reference and information beams is the creation of an interference pattern which is stored as a hologram in the storage medium.

The storage medium may take one of a number of different forms. As one example, the medium may be a photographic film which stores a photographic pattern corresponding to the light intensity variations of the interference pattern. As another example, the medium 10 may simply be a thin metal film which is heated by the reference and object beams to an extent sufficient that the surface of the film becomes distorted. The surface, in fact, selectively evaporates in accordance with the intensity profile of the interference pattern and there remains a thickness profile which is a replica of the intensity profile of the light striking the surface. This type of hologram pattern may be formed on films of material such as bismuth or manganese or other metals or other nonmetallic materials on a glass or quartz substrate.

In a preferred system for forming thickness profile holograms of the type discussed above, the mask 28 may be eliminated. In a system of this type, the object beam which is vary intense and of very narrow cross section has a major portion of the energy required to form the hologram and the more diffuse object beam has less energy in the region where the two beams meet on the film. Thus, the coincidence of the two beams is required to form a contour pattern on the region of the film which is much less intensely illuminated, that is, the region which only the object beam strikes, is not affected by the object beam. It is of course of advantage to be able to eliminate the mask and the mechanical means required to position the mask.

A phase hologram such as described above, may be read out by the portion 12, 16 of the system of FIG. 1 and a readout means such as 40. The remaining elements 14, 18, 20, 22, 24, 26 may be removed. The laser beam at relatively low intensity is deflected to a desired location on the storage medium. The readout means may be located at 40, that is, in a position conjugate to that of the page 26 during the writing of information. At this location, the reconstructed image results from transmission of light through the hologram. Alternatively, and in the present invention shortly to be discussed, the alternative is the preferred operating method, the readout means may be at location 26. Here, the reconstructed real image is formed by reflection of light from the hologram.

The readout means 40 may take one of a number of forms. For example, the readout means may be an array of photocells, each at a position corresponding to that of a bit of information on the page. In the example chosen for illustration, there are 16 such photocells, each identified by the character P.

While the systems discussed above are operative and useable, they do have, in certain applications, one serious disadvantage. The information is permanently stored and the contents of the memory therefore cannot readily be altered. In the memory system of the present invention, as shown in the following figures, each memory location can be selectively erased and each memory location subsequently can be made to receive new information.

A preferred embodiment of the present invention is shown in FIG. 4. In practice, the memory is enclosed, however, the covering facing the reader is removed for ease of illustration. The memory includes a glass or quartz substrate 50 and plurality of very small compartments adjacent to this substrate. Three of the compartments 52, 54 and 56 are visible in the drawing. Each such compartment is separated from the next adjacent compartment by walls which may be formed of an insulating material such as glass. In FIG. 4, four of such walls are visible at 58, 60, 62 and 64. There also may be walls which separate the compartments in column directions, as is clear from FIG. 5.

A filament is located in each compartment. Three such filaments are visible in FIG. 4 at 66, 68 and 70 and two other of the filaments are shown in phantom view at 72 and 74. Each filament may comprise a single turn of high-melting-point, high-resistance metal such as tungsten which is impregnated with the storage medium material. Two such materials which have been found to provide good operating performance are bismuth and manganese. Other materials such as zinc and compounds of bismuth, manganese and zinc in various combinations or with other metals and also nonmetallic materials are also possible. In general, the material employed should have low thermal conductivity and low boiling point.

The memory of FIG. 4 also includes a set of X-conductors, three of which are shown at X1, X2 and X3, and a set of Y-conductors, three of which are shown at Y1, Y2 and Y3. Each filament is connected to a different pair of conductors. For example, filament 66 is connected to conductors X1 and Y1; filament 72 is connected to conductors X1 and Y2; filament 68 is connected to conductors X2 and Y1 and so on. The X conductors, of course, are insulated from the Y conductors as, for example, by a layer of insulating material such as 76.

A driver 78 is connected through a decoder 80 to the Y conductors. A driver 82 is connected through a decoder 84 to the X conductors.

In operation, the memory of FIG. 4 is located at the position of storage medium 10 of FIG. 1 with the glass or quartz faceplate facing the deflection system 16. The readout means is located at the real image position, that is, at 26. It may be assumed that the inner surface of the faceplate 50 initially is coated with a thin film of bismuth. Information may be written onto a desired location in the same manner as already discussed, namely by applying an object and reference beam to the area of the faceplate over one of the compartments. The beams should be of short duration and of sufficiently high intensity to form a phase hologram in the film.

The readout of each memory location is also conventional. A low-power laser beam is applied to a memory location and the readout means at 26 receives the real image of the holographically stored information.

Erasure of any location in the memory system of the invention is accomplished by heat as, for example, by applying a reference laser beam to that location at sufficient intensity to remove the film at that location.

After a memory location is erased, it may be renewed in accordance with the present invention by applying drive currents to a selected X-conductor and a selected Y-conductor. For example, a drive current in the direction of arrow 90 may be applied to conductor X1 and a drive current in the direction of arrow 92 may be applied to conductor Y1. In response to the selection of these two conductors by the decoders 80 and 82 sufficient current flows through filament 66 to flash evaporate the metal such as bismuth which impregnates the tungsten filament and to cause it to plate onto the inner surface of the faceplate 52.

In practice, the compartments such as 52, 54 and so on may be closed and at a vacuum of $10^{13}$ millimeters of mercury. The bismuth may be evaporated from the filament at this ambient pressure at a temperature of 600° C. or so. It is found that a flash-evaporated layer of about 50 Angstroms is satisfactory and to obtain a layer this thick requires power to the filament in the amount of about 4 millijoules. The time required to flash evaporate a layer this thick may be from one-tenth to one-thousandth of a second, dependent upon various parameters such as the power employed, the spacing between the filament and substrate and so on.

The drawing of FIG. 4 is not to scale and, in addition, is greatly enlarged. In practice, the filament may have a length of 1 millimeter or less (1 millimeter is approximately $40 \times 10^{13}$ inches) and a cross section of somewhat less than 1 millimeter. The filaments may be formed by welding tungsten wires to the lead wires extending from the insulating structure 100.

Figure 5:
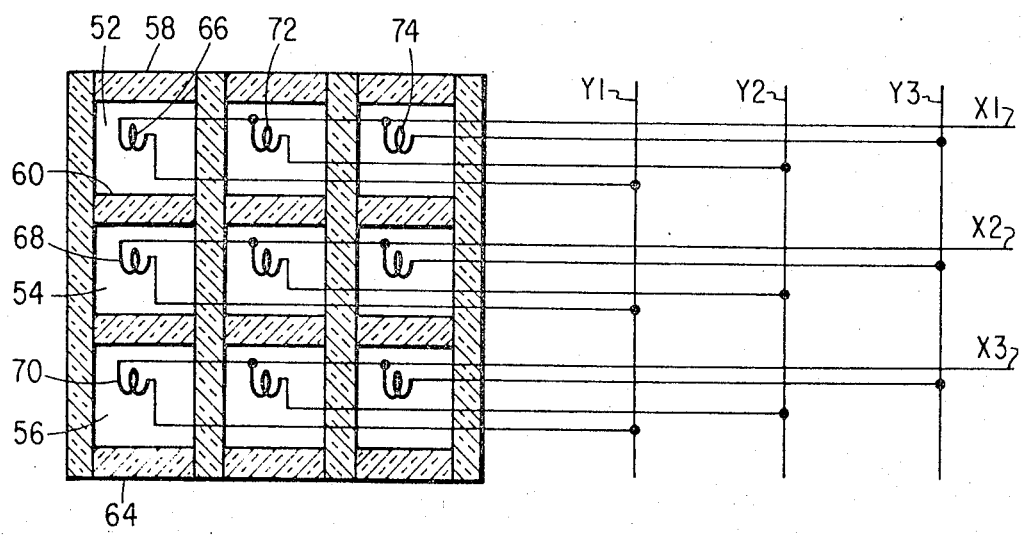
FIG. 5 is a schematic showing of a section taken through a portion of FIG. 4.

FIG. 5 is a cross section taken through the compartments of FIG. 4. For purposes of the present explanation, a memory having only nine locations is shown. Similar parts in the two figures are identified by the same reference numerals.

In the embodiment of the invention discussed above, the storage medium is stationary and the heat is directed to different portions of the medium. Another alternative is possible. In this one, the storage medium is formed on the surface of a card such as the cards employed in the RCA 3488 Random Access Mass Memory System (at present such cards store information magnetically). Employing a card of this type, the means for renewing the film after the old information has been erased therefrom may be a fixed heating station to which the card is delivered for surface renewal.

What is claimed is:
1. A method for erasing and then writing on a thin film memory comprising the steps of:
    applying heat to a selected location of the memory at an intensity sufficient at least to destroy the information stored in the film at that location;
    applying heat to material of which the film is made located immediately adjacent to said selected memory location to flash evaporate a thin film onto that memory location; and
    writing on said film at said memory location.
2. The method of claim 1 wherein said destruction of the stored information is accomplished by applying intense light to said memory location.
3. The method of claim 1 wherein said heating of said material is accomplished by applying electrical energy to said material.
4. The method of claim 3 wherein said writing is accomplished by applying a light pattern to said film at an intensity sufficient to create a corresponding contour pattern in said metal film.
5. A memory comprising, in combination:
    a substrate;
    a film on the substrate at different locations of which information may be stored;
    means for selectively erasing said locations comprising means for selectively heating said locations; and
    means for renewing an erased location comprising means for selectively flash evaporating a new film at that location.
6. A memory comprising, in combination:
    a smooth, insulating substrate;
    a metal film on the substrate at different locations of which a plurality of phase holograms may be stored;
    means for selectively erasing said locations comprising means for selectively heating the film said locations; and
    means for renewing an erased location comprising means for selectively flash evaporating a new metal film at that location.
7. A memory as set forth in claim 6 wherein said means for selectively erasing comprises means for applying light to a selected location at an intensity sufficient to evaporate said film.
8. A memory as set forth in claim 6 wherein said last-named means comprises a plurality of heating elements, one per memory location, and the metal to be evaporated on each such filament.
9. A memory as set forth in claim 8 wherein each filament is located in a vacuum.

* * * * *